March 4, 1969 J. B. SABINE 3,430,661
FLANGED PLASTIC PIPES
Filed June 1, 1965 Sheet 1 of 2
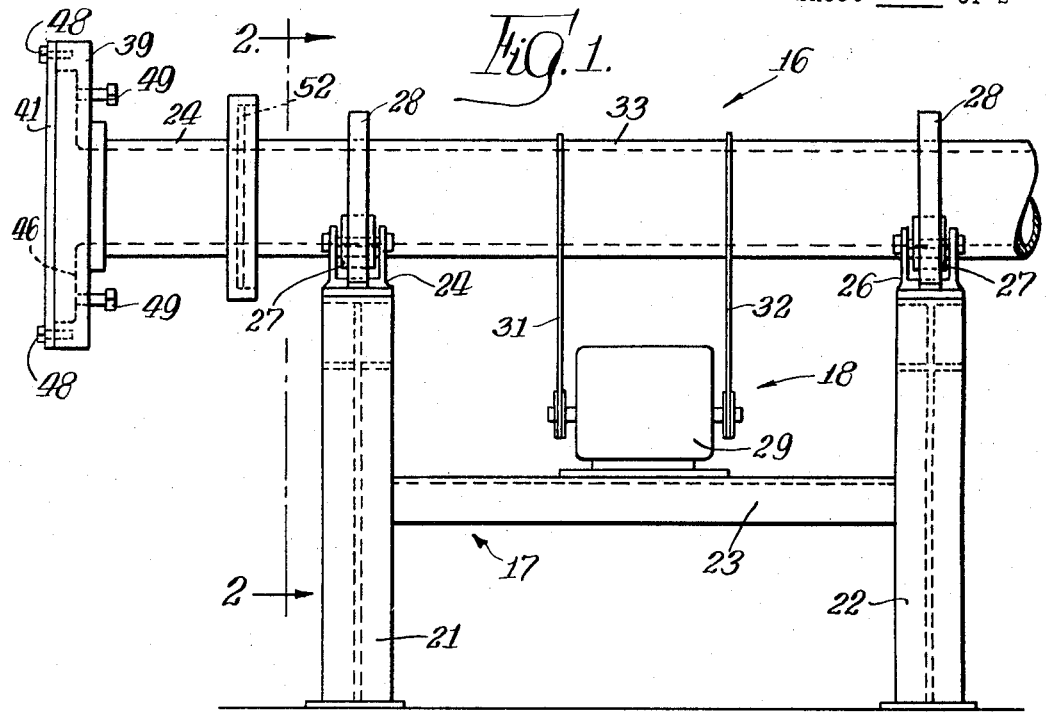
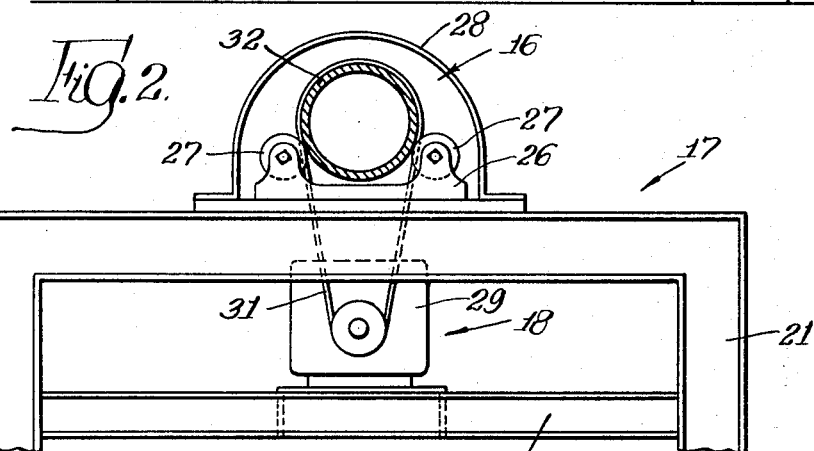
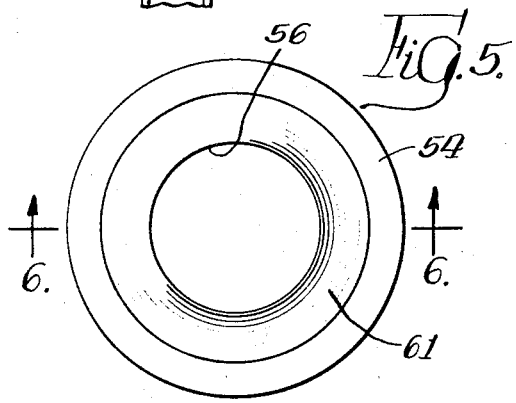
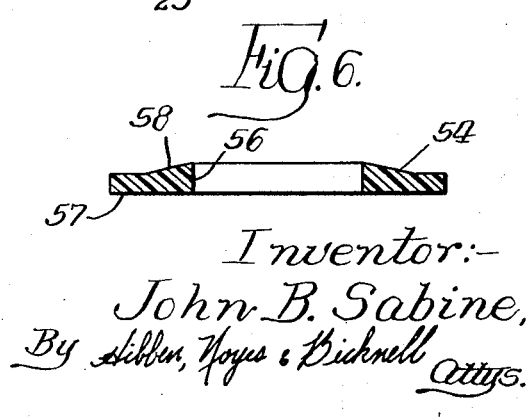
Inventor:—
John B. Sabine,
By Hibben, Noyes & Bicknell Attys.

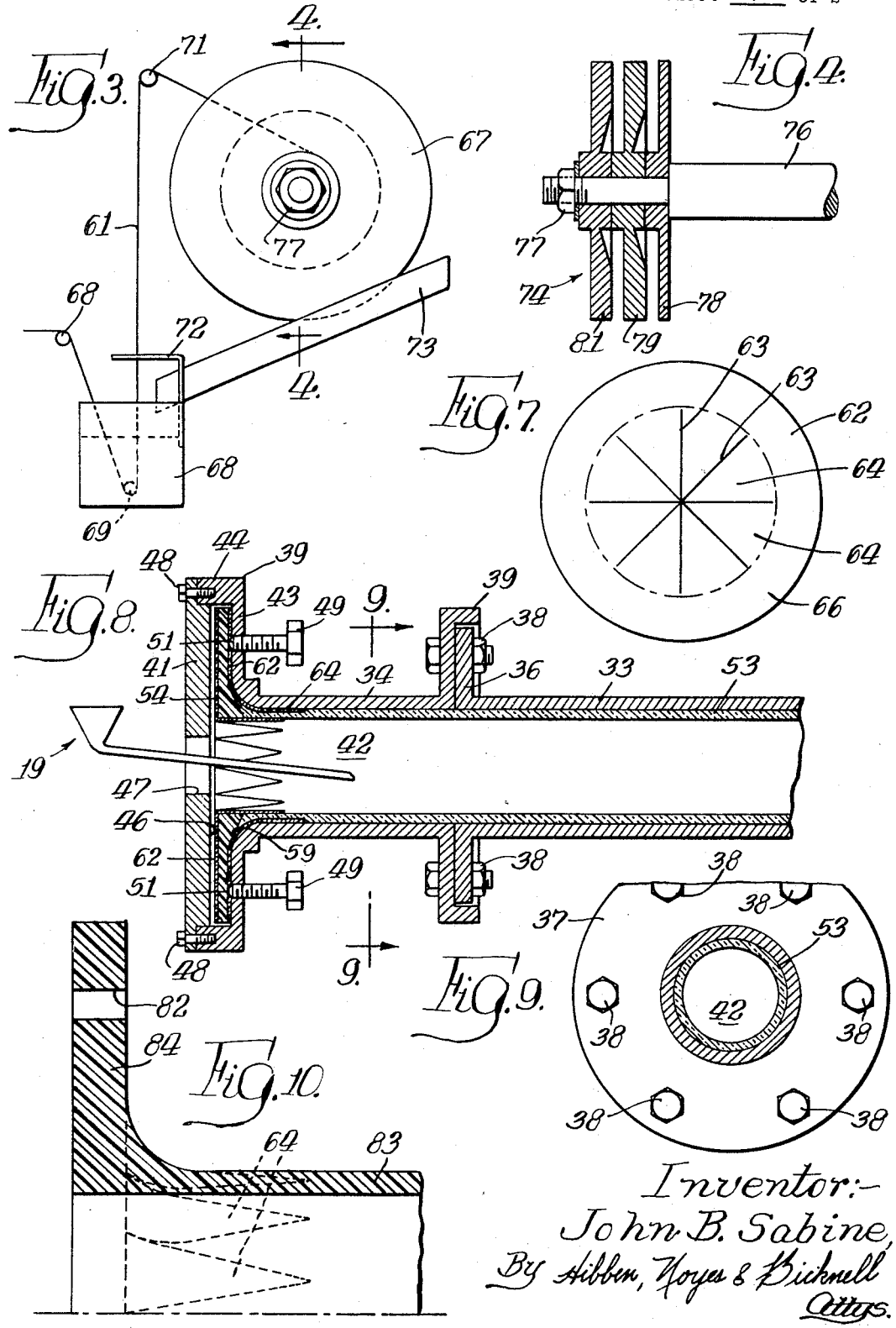

United States Patent Office 3,430,661
Patented Mar. 4, 1969

3,430,661
FLANGED PLASTIC PIPES
John B. Sabine, c/o Sabine Plastics, Inc., P.O. Box 7282,
Mobile, Ala. 36607
Filed June 1, 1965, Ser. No. 460,099
U.S. Cl. 138—109
Int. Cl. F16l 9/14, 13/14, 19/02
5 Claims

ABSTRACT OF THE DISCLOSURE

A flanged pipe of fiberglass reinforced plastic material formed in a manner to provide a pipe portion that merges smoothly into a strong flanged portion that is integral with the pipe portion. The pipe portion comprises a plurality of layers of fiberglass material embedded in solidified plastic material and the flange portion is reinforced by a certain type of filler disk that is also embedded in solidified plastic material. The connection between the flange portion and the pipe portion is reinforced by fiberglass riser pieces.

Disclosure

This invention relates generally to the manufacture of plastic pipes of a type commonly used in the chemical industry and more particularly to flanged plastic pipes.

Pipes, both flanged and straight and made of various plastic materials are used extensionly as conduits for chemicals in the chemical industry. Such pipes are important because, in general, they are far less chemically active than commonly used pipes of metal.

The manufacture of pipes of plastic, such as polyester resins and epoxy resins, has been generally a slow process. Until quite recently such pipes were fabricated substantially by hand. The flanged pipes, in particular, were manually built up laminated structures to have the strength desirable. Moreover, they were subject to warping during curing and frequently required extensive machining after being formed. Thus, such pipes were relatively difficult to manufacture and relatively expensive.

It is a primary object of this invention to provide a simplified mode of manufacturing flanged pipes of polyester resins and the like.

A further object is to provide a novel method and novel apparatus for centrifugally forming reinforced plastic pipes.

Another object is to reduce the cost of manufacture of reinforced plastic flanged pipes which improving the strength and other qualities of such pipe.

Yet another object is to provide an improved mode of reinforcing the flange of a flanged plastic pipe, thereby improving strength and dimensional stability in the flange.

Still a further object is to provide a mode of fabricating a reinforced pipe and flange as an integral unit.

Other objects and advantages of the invention will be apparent from the following description taken in conjunction with the accompanying drawings wherein:

FIG. 1 is a side view of a machine for centrifugally forming plastic flanged pipes and embodying features of the invention;

FIG. 2 is a view taken along line 2—2 in FIG. 1;

FIG. 3 is a side view of an apparatus for forming a novel reinforcing disk used in flanged pipes made in accordance with the invention;

FIG. 4 is a sectional view taken along line 4—4 in FIG. 3;

FIG. 5 is a top plane view of the novel reinforcing disk;

FIG. 6 is a sectional view taken along line 6—6 in FIG. 5;

FIG. 7 is a plan view of another reinforcing element used in flanged pipes made in accordance with this invention;

FIG. 8 is a fragmentary sectional view of part of the apparatus shown in FIG. 1;

FIG. 9 is a fragmentary view taken along line 9—9 in FIG. 8; and

FIG. 10 is a fragmentary longitudinal sectional view of a flanged pipe made in accordance with this invention.

Broadly speaking, the objects of the invention are accomplished by an improved mode of centrifugally forming a plastic pipe and flange as an integral unit. Various preformed reinforcing elements are mounted in a rotatable mold and centrifugal force is used to position the elements. Thereafter, plastic material, liquid in form, is introduced into the mold as the mold is rotated at a high rate of speed. The plastic material, in this instance a polyester resin, is distributed within the mold and around the reinforcing elements, some of which are of fiberglass, by centrifugal force. Rotation of the mold is continued until the plastic material has solidified.

The apparatus used in forming flanged pipes in accordance with this invention includes a novel rotatably driven mold in which the flanged pipes are formed and cured. The mold is adapted to make a flanged pipe of standard size and has a flange forming portion that is separable from the remainder of the mold whereby the mold may be adapted to centrifugally form a straight pipe. The mold also includes means for forcing the flanged pipe from the mold after it has cured, the forcing means also locates and marks the position on the flange where bolt holes will be drilled.

The apparatus also includes a winding device for forming a disk shaped reinforcing element that is embedded in the flange portion of the flanged pipes made in accordance with this invention.

Flanged pipes made in accordance with this invention comprise an elongated tubular pipe portion having a radially extending integral flange portion at one end. Both the pipe portion and the flange portion are reinforced for strength and to prevent warping and other deformation as a result of curing.

FIGS. 1, 2 and 8 show a preferred form of the apparatus for centrifugally forming flanged plastic pipes in accordance with the present invention. The apparatus comprises a mold, indicated generally at 16, means for rotatably supporting the mold, in this instance a frame 17, drive means 18 for rotating the mold 16 at a high rate of speed and tube means, indicated generally at 19 in FIG. 8 for introducing plastic material into the mold 16 during rotation thereof.

The frame 17 comprises a pair of longitudinally spaced leg assemblies 21 and 22 rigidly interconnected by a motor platform 23. In the present instance the leg assemblies 21 and 22 and the motor platform are preferably rigid structural iron members to withstand the forces generated during high speed rotation of the mold 16. Mounted on the tops of the leg assemblies 21 and 22 are roller bases 24 and 26. The roller bases 24 and 26 each include a pair of laterally spaced rollers aligned as shown in FIGS. 1 and 2 in order to rotatably support the pipe mold 16, as shown. Each roller base is provided with a safety hoop 28 to prevent the mold 16 from being accidentally thrown from the frame 17 during operation.

The drive means 18 comprises, in the present instance an electric motor 29 and a pair of belts 31 and 32 which directly connect the motor to the mold 16 as shown. The motor 29 is mounted below the mold 16 and is rigidly secured to the motor platform 23. The motor 29 and its associated belts 31 and 32 are adapted to rotate the mold 16 at a righ rate of speed. Preferably, the speed is sufficient to generate a centrifugal force in the periphery of the mold of about forty times the force of gravity.

The mold 16, is adapted to form both flanged pipes of the type discussed herein and straight pipes. To this end, the mold 16 comprises a straight tubular portion 33 and a flange forming portion 34. As shown in FIGS. 1 and 8 the portions 33 and 34 are interconnected in axially aligned relation. In the present instance the portion 33 has an end flange 36 which couples with a flange 37 on an end of the portion 34. The flanges 36 and 37 are interconnected by a plurality of circumferentially arranged bolts indicated at 38 in FIGS. 8 and 9. The portions 33 and 34 may be separated by removal of the bolts 38, and upon removal of the portion 34, the portion 33 may be used for centrifugally forming straight pipe, that is a pipe without a flange.

As indicated above, the portion 34 of the mold is adapted to form a flange on the end of the pipe when the portion 34 is coupled to the portion 33 as shown in FIG. 8. The portion 34 comprises a pair of separable members, a tubular member 39 and a cover member 41. The tubular member 39 defines an axially extending space 42 located intermediate the flange 37 and a wall 43 extending radially outwardly at the opposite end of the tubular member 39. At the outer periphery of the wall 43, the member 39 is provided with an axially extending circumferential rim 44 which defines an annular space 46 in which a flange is formed.

Cover member 41 is annular, having a central opening 47, and is seated against the rim 44. A plurality of circumferentially spaced bolts 48 secure the cover member 41 to the rim 44, as shown in FIG. 8. The cover member 41 is separable from the tubular member 39 upon removal of the bolts 48, in order that a flanged pipe formed in the mold 16 may be removed therefrom.

The removal of a flanged pipe from the mold 16 frequently requires a great deal of force. To assist in such removal the tubular member 39 is provided with means for forcing a flanged pipe from the mold. In this instance, the forcing means comprises a plurality of circumferentially spaced screws 49 mounted as shown in FIG. 8 in wall 43 of the member 39. The screws 49 also serve to mark the location of the bolt holes which later will be drilled in the flange portion of the flanged pipe. Thus, the screws 49 have pointed ends, as at 51 which project into the space 46. The six screws 49 are position to correspond to the location of bolt holes in a standard pipe flange. Thus, after a flanged pipe has been formed in the mold 16, it may be removed from the mold, after the cover 41 member has been separated from the member 39, by means of the screws 49 forcing the flange axially outwardly from the mold 16.

It is frequently desirable to form flange elements which are standard in size and not made integral with a pipe. The present mold 16 may be adapted for this purpose by inserting a separator plate, shown in dotted lines at 52 in FIG. 1, between the end flange 36 and the flange 37. The separator plate acts as a dam to prevent liquid plastic material from flowing axially into the portion 33 of the mold 16.

Flanged pipes formed according to the present invention, as mentioned above, are reenforced by several different forms of reenforcing elements. One of the reenforcing elements is a rectangular sheet of a reenforcing material such as fiberglass, mat or fabric, such element being shown at 53 in FIGS. 8 and 9. The reenforcing element or mat 53 form a lining in the mold 16, that is it is coiled within the mold 16, the mat 53 being sufficiently long to extend substantially the full length of the mold and sufficiently wide to provide a plurality of thicknesses within the mold. The mat 53 is coiled in the mold 16 in such a way that centrifugal force will tend to expand the mat coil outwardly into intimate contact with the mold 16.

A second form of reenforcing element used in the flanged pipes according to this invention is a reenforcing disk 54 shown in FIGS. 5, 6 and 8. The reenforcing disk 54 is a preformed and cured reenforced plastic disk. The disk 54 is annular, having a central opening 56. Also, the disk 54 is shaped to have a flat radially extending face 57 and an opposite face that has a taper as at 58, adjacent the opening 56 whereby the disk 54 is thicker at its inner periphery than at its outer periphery. The tapered portion of the face 58, when mounted in the mold 16 as shown in FIG. 8, coacts with a curved face 59 on the mold in such a way that the disk 54 is centered in the space 46 by a centrifugal force when the mold is rotated.

As mentioned above, the disk 54 is reenforced and has been preformed and cured. In the present instance the disk 54 comprises filament material that is helically wound outwardly relative to the center of the disk and imbedded in a solidified plastic material, such as in polyester or epoxy resin material. In the present instance the filament is 61, and the filament is wound inside the disk several layers thick, as will be apparent from the further description hereinafter.

A third form of reinforcing element, a flange face and riser piece 62, is shown in FIG. 7. The flange face and riser piece 62 is circular, as shown in FIG. 7, and is formed of fiberglass mat or fabric material similar to that of the element 53. The flange face and riser piece 62 is provided with a plurality of radial cuts, some of which are indicated at 63 in FIG. 7. The cuts extend from the center of the element outwardlly and they terminate at a point spaced inwardly from the edge of the member 62. In the present instance there are 8 such cuts 63 equally spaced circumferentially of the element 62, the cuts forming triangular fingers, two of which are indicated at 64 in FIG. 7 which are joined at their bases to an annular portion 66.

FIGS. 3 and 4 illustrate a preferred form of apparatus used in preforming the reenforcing filler disk 54. As shown in FIG. 3, somewhat diagrammatically, the apparatus comprises a filament winder 67, a liquid plastic container 68, a plurality of horizontally extending guide bars 68, 69 and 71 for directing the filament 61 into and out of the plastic bath in the container 68 and onto the filament winder 67, a wiper element 72 for removing excess liquid plastic from the filament 61 and a trough 73, disposed under the winder 67 to return excess plastic material to the container 68.

As shown in FIG. 4, the filament winder 67 comprises a spool 74 secured to the end of a shaft 76 by a nut 77 threaded onto the end of the shaft 76. The spool 74, in this instance, comprises three circular elements 78, 79 and 81 having the cross-sectional configurations shown in FIG. 4 and thus, defining spaces therebetween which shape two filler disks 54 at the same time as the spaces are filled with the plastic laden filament 61. The shaft 76 is motor driven to spin the spool 74. As shown in FIG. 3, the filament 61 is attached to the spool 74 and upon rotation of the spool the filament is pulled through the plastic bath in container 68 and deposited on the spool thereby filling the spaces between the element 78, 79 and 81. The wiper 72 is adjusted so the resulting disk will be about sixty percent filament and forty percent plastic. After the spool 74 is filled, the plastic material, such as a polyester resin or epoxy resin, is allowed to cure in place on the spool 74, thus bonding the filaments together. After having cured, the reenforcing disks 54 may be removed from the spool 74 by removing the nut 77 and the elements 81 and 79. The resulting disks 54 are strong and dense, and since the filaments are applied, somewhat in tension, the disk is dimensionally stable and is able to resist warping. It is important that the disks 54 be completely cured and to this end they are aged for about one week prior to use.

In order to prepare flanged pipes in accordance with the present invention it is necessary, of course, to first prepare the various reenforcing elements described above. Next, the mold 16 is treated with a suitable mold release compound, if required by the materials being used, and the flange forcing screws 49 are positioned so that their ends 51 project into the space 46 substantially as shown in FIG. 8. Thereafter, a plurality of flange face and riser pieces 62 are placed in the mold 16 with their annular portions 66 adjacent the wall 43 and with their fingers 64 projecting axially into the space 42 as shown. (The number of riser pieces is determined by the size and strength of the pipe.) The flange face and riser pieces 62 should be arranged so no two fingers fall directly on top of each other. A reenforcing disk 54 is then inserted into the space 46 with the tapered face 58 projecting toward the curved face 59 on the mold. Additional flange face and riser pieces 62 are inserted against the flat face 57 of the disk 54. The rectangular reenforcing element 53 is then coiled and inserted into the cylindrical space 42, as shown in FIG. 8, so that it overlies the ends of the fingers 64 and extends substantially the full length of the mold. The direction of coil of the element 53 should be opposite to the direction of rotation of the mold 16 so that centrifugal force can act to expand the coil.

The cover member 41 can be fastened to the tubular member 39 either before or after the element 53 is inserted into the mold. However, I have found it more expedient to mount the cover 41 prior to inserting the element 53.

After the reinforcing elements have been properly positioned in the mold 16 and the cover member 41 secured in place (care having been taken to insure that all of the fingers 64 of riser pieces 62 are pointed into tubular portion of the mold under the reinforcing element 53, so it can hold them firmly against the sides of the mold) the mold 16 is rotated at a speed sufficient to develop a centrifugal force of approximately forty times the force of gravity in the periphery of the mold. The mold is rotated for a substantial period of time, such as for five minutes, so centrifugal force acting on the reinforcing elements will properly position them within the mold. Thereafter, plastic material, such as polyester resin or an epoxy resin, in liquid form is added to the mold through the tubular means 19 as the mold 16 continues to spin. (If the plastic material is of the type that must be catalyzed, the catalyzing element is added to the plastic prior to introducing the plastic in the mold 16.) After the plastic material has been introduced into the mold, the mold is continuously rotated until the plastic has solidified. If the plastic is a polyester resin, rotation is continued until the resin has passed its peak exotherm and has cooled to within about ten degrees of room temperautre. Thereafter rotation is stopped, the cover member 41 removed, and the flanged pipe forced partially out of the mold by gradually screwing, successively, the screws 49 inwardly with respect to the wall 43. The flanged pipe may then be pulled from the mold by a steady pull on the flange. The flange is completed by drilling bolt holes, such as shown at 82 in FIG. 10, at the locations marked by the screws 49.

FIG. 10 shows a fragmentary view, partially in section, of a flanged pipe formed in accordance with the present invention, which pipe comprises an elongated tubular pipe portion 83 which merges smoothly into an integral radially extending flange portion 84. As indicated, the reenforcing elements 53, 54 and 62 are imbedded in the plastic material and cooperate to reinforce the pipe portion 83 and the flange portion 84. A hint of the fingers 64 of the riser pieces 62 may be seen at 64 in FIG. 10. Because of the way the pipe is formed, the reenforcing elements are located at or near the outer surface of the pipe, for greater strength. The inner surface is extremely smooth pure resin material, providing good flow characteristics and high resistance to chemical attack.

From the foregoing it can be seen that the present invention provides a novel mode of forming flanged pipes of reenforced plastic material. The flanged pipes made in accordance with this invention are strong and resist warpage and other distortion normally experienced in conventional plastic flanged pipes during the curing cycle. Moreover, flanged pipes made in accordance with the present invention have a great deal of shear strength due to the continuous winding of the filaments in the preformed disk member 54. Thus, flanged pipes made in accordance with the present invention are less expensive than conventional laminated plastic flanged pipes.

I claim:

1. A flanged pipe of the type described, comprising a pipe portion and a flange portion on an end of said pipe portion, said pipe portion comprising a plurality of circumferentially disposed layers of fiberglass reenforming material embedded in solidified resin plastic material, said flange portion comprising an annular reenforcing filler disk of precured reenforced resin material embedded in solidified resin plastic material and extending radially outwardly from said pipe portion, said pipe portion merging smoothly into said flange portion and being integral therewith.

2. A flanged pipe according to claim 1, in which said disk comprises filament material helically wound outwardly relative to the center of the helix and embedded in solidified resin material.

3. A flanged pipe according to claim 1, in which said flange portion includes a plurality of fiberglass reenforcing riser pieces disposed on opposite sides of said filler disk, said riser pieces having axially extending portions covered by said layers of fiberglass material.

4. A flanged pipe according to claim 3, in which said filler disk has a flat radially extending face and an opposite face that has a taper to provide an axially thickened portion at its inner periphery.

5. A flanged pipe according to claim 1, in which said flange portion has a plurality of circumferentially spaced bolt holes, said holes projecting through said filler disk.

References Cited
UNITED STATES PATENTS

| | | | |
|---|---|---|---|
| 2,150,412 | 3/1939 | Berwick | 138—137 X |
| 2,703,109 | 3/1955 | Saville | 138—137 X |
| 2,934,095 | 4/1960 | Lockhart | 138—138 X |
| 2,943,967 | 7/1960 | Simon | 138—141 X |
| 3,224,795 | 12/1965 | Conley | 138—109 X |
| 3,318,339 | 5/1967 | Stowell et al. | 138—138 |

EDWARD J. EARLS, *Primary Examiner.*

U.S. Cl. X.R.

138—144; 285—416